United States Patent
Jatkowski

(12) 
(10) Patent No.: US 6,457,012 B1
(45) Date of Patent: Sep. 24, 2002

(54) METHOD AND SYSTEM OF UPDATING ADDRESS RECORDS UTILIZING A CLIENTSERVER INTERFACE

(75) Inventor: Paul Jatkowski, Grosse Pointe Woods, MI (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/872,435

(22) Filed: Jun. 10, 1997

(51) Int. Cl.[7] .............................................. G06F 17/30
(52) U.S. Cl. ..................... 707/101; 707/10; 707/100; 707/104; 700/226; 364/478.07
(58) Field of Search ................... 707/100, 101, 707/10, 104; 380/25; 379/201; 364/478.12, 478.14, 478.07; 235/462.24; 700/226; 709/217

(56) References Cited

U.S. PATENT DOCUMENTS

| | | | |
|---|---|---|---|
| 4,992,649 A | | 2/1991 | Mampe et al. ............... 235/462 |
| 5,005,124 A | | 4/1991 | Connell et al. .............. 364/401 |
| 5,050,078 A | | 9/1991 | Sansone ..................... 364/406 |
| 5,073,954 A | | 12/1991 | Tyne et al. .................... 382/18 |
| 5,142,482 A | | 8/1992 | Sansone ..................... 364/478 |
| 5,146,403 A | * | 9/1992 | Goodman ................... 364/401 |
| 5,227,970 A | * | 7/1993 | Harris ......................... 364/419 |
| 5,239,577 A | * | 8/1993 | Bates et al. ................. 379/201 |
| 5,341,505 A | | 8/1994 | Whitehouse ................ 395/800 |
| 5,377,120 A | * | 12/1994 | Humes et al. .......... 364/478.12 |
| 5,410,646 A | | 4/1995 | Tondevold et al. ......... 395/149 |
| 5,422,821 A | * | 6/1995 | Allen et al. ............. 364/478.07 |
| 5,446,880 A | * | 8/1995 | Balgeman et al. ............. 707/10 |
| 5,452,203 A | * | 9/1995 | Moore ........................ 364/401 |
| 5,563,955 A | | 10/1996 | Bass et al. .................. 382/101 |
| 5,608,874 A | * | 3/1997 | Ogawa et al. .............. 395/200 |
| 5,612,889 A | * | 3/1997 | Pintsov et al. ......... 364/478.14 |
| 5,709,783 A | * | 1/1998 | Sanchez et al. .......... 156/89.12 |
| 5,781,634 A | * | 7/1998 | Cordery et al. ............... 380/25 |
| 5,987,508 A | * | 11/1999 | Agraharam et al. ........ 709/217 |
| 6,006,237 A | * | 12/1999 | Frisbey ....................... 707/104 |
| 6,292,709 B1 | * | 9/2001 | Uh et al. ..................... 700/226 |
| 2001/0010334 A1 | * | 8/2001 | Park et al. .............. 235/462.14 |
| 2001/0037463 A1 | * | 11/2001 | Salta .......................... 713/201 |

OTHER PUBLICATIONS

ForwardTrak Technical Specification, dated Apr. 1997.

* cited by examiner

Primary Examiner—Charles R. Rones
(74) Attorney, Agent, or Firm—Brian A. Lemm; Angelo N. Chaclas; Charles R. Malandra, Jr.

(57) ABSTRACT

The invention is a method and system of updating address data representative of a changed address. Updates are accomplished by initiating an address data request at a client system. The request is transmitted to an application host system where it is translated into a format readable by a master system comprising change of address files. The interface between the application host system and the master system includes a translation step. The translation step begins by creating a data map representative of the address data request. The created data map is compared against either a mailing list correction (MLC) scheme or a multi-line optical character reader (MLOCR) scheme to establish a second data map representative of the address request. The second data map is then transmitted via a SCSI interface to the master system for processing of the address request. The master system matches the address data request to records of address changes to determine whether a match exists. If a match occurs, then a record of the match is placed into an address data reply which is then transmitted back to the application host system where it is first translated and then transmitted back to the client for use in updating address files. The system is capable of printing one or more reports representative of the requests, replies, and/or statistics arising from the transactions.

10 Claims, 6 Drawing Sheets

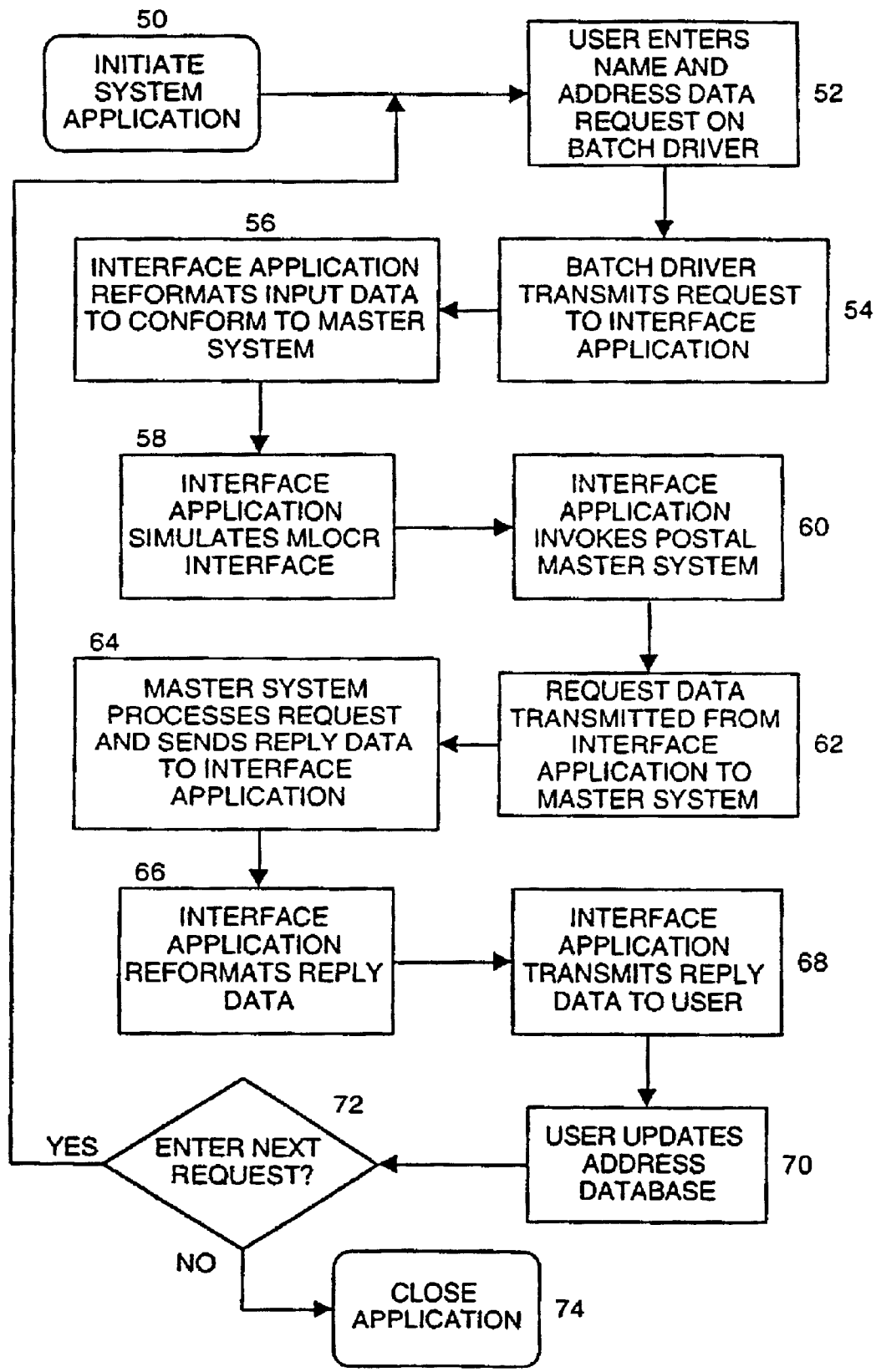

METHOD AND SYSTEM OF UPDATING ADDRESS RECORDS UTILIZING A CLIENTSERVER INTERFACE

BACKGROUND OF THE INVENTION

The challenges of mail delivery within the United States and in the growing ranks of industrialized countries has grown so that, in the United States alone, the postal service delivers approximately 600 million pieces of mail per day. To the growing postal burden is added the requirements of keeping address data accurate in the face of a growing social mobility. To promote operating efficiency, the United States Postal Service (U.S.P.S.) has offered discounts for the use of 5 digit zip codes, bar codes, delivery point bar coding, and various forms of address coding such as those used on the Optional Endorsement Line of printed address blocks.

The most common form of coding is directed to the postal zip code. The basic elements of a postal zip code consist of four parts; these are: (i) the "zip code," which consists of 5 digits and refers to geographic area or zone; (ii) the "zip plus 4" further breaks down a zip code region into smaller sub-regions, this consists of four digits added to the base zip code; (iii) "delivery point digits" which consist of two additional digits that further break down a zip plus 4 so that the U.S.P.S. can more accurately pin point an exact location; and, (iv) a check sum digit. The delivery point digits are extracted from the street line of the address using a U.S.P.S. approved algorithm.

But, the best coding systems available are of little use if the intended recipient is no longer at the address that has been coded. Of particular concern to the U.S.P.S. is the relatively high amount of mail that is undeliverable because the intended recipient has moved and not left a forwarding address.

With the need to reduce costs while improving the efficiency and reliability of its operations, continuous review of methodology and the systems used to implement operations is continuously required. Review by the U.S.P.S. has led to a series of sweeping changes that are to be implemented in a series of changes grouped together under the banner of "Postal Reclassification." The first such change occurred on Jul. 1, 1996; the second on Jan. 1, 1997. The new standards under Postal Reclassification will enable the U.S.P.S. to improve efficiency and remain competitive by reducing the amount of work effort required to deliver mail.

The change of Jan. 1, 1997 includes standards for a series of move updates that effect address databases. Among the standards are: a National Change of Address (NCOA); U.S.P.S. Address Correction Requested (ACR); USPS Forwarding and Address Correction Requested; USPS Address Change Service; and, access to USPS FASTforward technology.

Under the new standards, companies are required to show that they are implementing a process to track a customer's change of address. The U.S.P.S. requires that companies implement the change of address process against customer information files at least once every six months in order to continue receiving postal discounts for First-Class mail. In addition to maintaining discounts when utilizing certain U.S.P.S. services, companies will be able to add efficiencies by improving their customer satisfaction, reducing postage expenses, and reducing returned mail and rework costs.

One of the initiatives of the U.S.P.S., designed to improve the levels of address quality in corporate mailings, has been the development of FASTforward which has evolved from work between the U.S.P.S. and vendors of commercial multi-line optical character readers (MLOCRs). The apparent goal of the U.S.P.S. is to have MLOCR solutions incorporate FASTforward technology to help identify customer change of address information.

FASTforward identifies and reads address data from the mailpieces introduced to the system, as well as the ZIP+4 coding, to determine if a change of address notification or forwarding order exists for a given addressee. If a change of address notification or forwarding order is found, then FASTforward has the capability for correcting the destination address on the mailpiece.

For those industry vendors developing systems for the mailing and/or addressing market, the U.S.P.S. has promulgated the FASTforward specification and requirements in order to promote uniformity and compatibility in interfacing the vendor product with the U.S.P.S. system. Vendors are responsible for design of the required interface systems. Thus, unique approaches are required for interfacing mailing and address systems with FASTforward in order to provide seamless service for customers.

One approach to designing an interface system for FASTforward is to create a client-server environment that provides privacy as well as control of customer data that is provided to FASTforward as well as obtained from it.

Therefore, it is an object of the present invention to provide a client-server interface and environment that provides privacy as well as control of customer data when interfacing with the U.S.P.S. FASTforward system. It is a further object of the present invention to utilize change of address information provided by the FASTforward system to return a new address and related data to the customer's mailing and/or addressing system and to include a graphical user interface (GUI) for easy task establishment and monitoring of the task execution.

SUMMARY OF THE INVENTION

The invention overcomes the shortcomings and limitations of the prior art and satisfies the intended objectives through a method and system of updating address data representative of a changed address. The method is accomplished by initiating an address data request at a data processing system (client).

The address data request is for an update of individual address records contained in the database serviced by the data processing system. The request is transmitted from the client to an application host system such as ForwardTrak. The address data request is translated at the application host system into a format readable by a master system comprising change of address files. In order for the translated request to be transmitted from the application host system to the master system, there must be created an interface that allows passage of the translated address data request from the application host system to master system so that said translated address data request can be read and responded to by the master system.

The interface is created during the method's translation step. The translation step comprises a number of further steps that begin with creating a data map of the data representative of the address data request. The created data map is compared against a second set of data representative of a mailing list correction (MLC) scheme, or a multi-line optical character reader (MLOCR) scheme. The comparison establishes a second data map which is representative of the address request in either the MLC or the MLOCR scheme. The second data map is then transmitted via a SCSI interface to the master system for processing of the address request.

The master system, such as the U.S.P.S. FastForward system, matches the address data request to records of address changes that are resident in an address database operatively connected to the master system. After matching the address data request against the change of address database, the method and system determine whether a match exists between the address data request and any address record resident on the address database. If a match occurs, then a record of the match is placed into an address data reply. The reply is then transmitted back to the application host system.

When a reply is received from the master system, whether that reply is positive (a match occurred) or negative (no match found), the reply is translated into a format capable of being read by the client data processing system. The translated reply is then transmitted back to the client for use in updating address files operatively accessible by the client data processing system.

The address files are updated by entering a new address extracted from the reply format if the result of the address record request was positive; that is, that a match occurred between the request and the master system's change of address file.

The system is capable of printing one or more reports. The reports are based on the transactions between the application data processor and the master system, and representative of the requests, replies, and/or statistics arising from the transactions.

BRIEF DESCRIPTION OF THE DRAWINGS

FIG. 2 is an upper level flowchart of the method of the ForwardTrak system which is a preferred embodiment of the subject system and method.

DETAILED DESCRIPTION OF THE PREFERRED EMBODIMENTS

Figure 1:
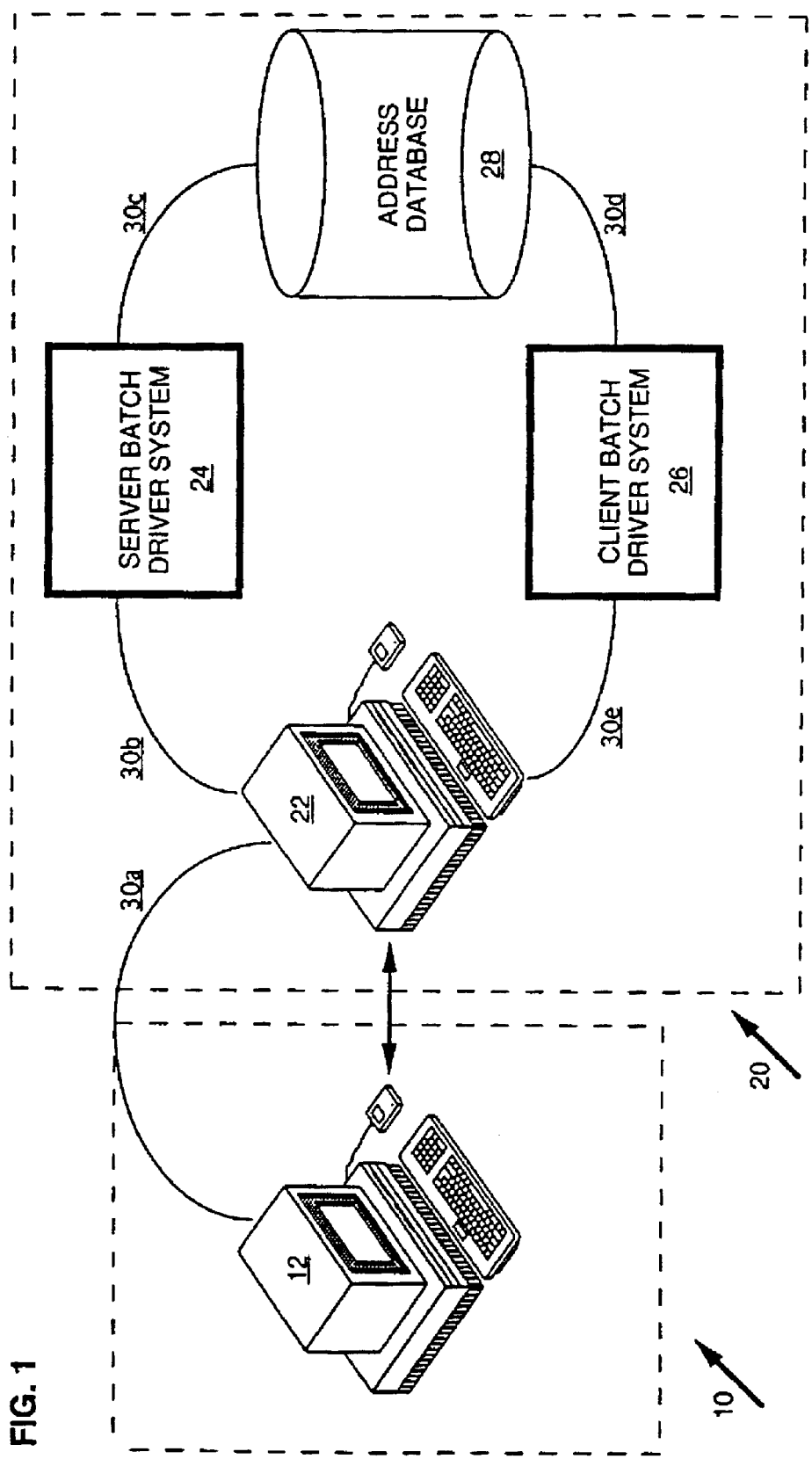
FIG. 1 is block diagram of a client server system utilizing the subject method of updating address data.

Turning to FIG. 1, there are depicted in block form two subsets that, combined, form an addressing system. In a preferred embodiment, the addressing system is comprised of the United States Postal Service (U.S.P.S.) FastForward system and a client server interface system such as the ForwardTrak system available from Pitney Bowes Inc. of Stamford, Connecticut. A draft copy of the ForwardTrak Operating Guide is attached hereto and is incorporated herein by reference.

Addressing subsystem 10 is a representative example of a system that could host the U.S.P.S. FastForward system. The representative system comprises: data processing system 12 which can be a mainframe or midframe computer which in turn is comprised of: a monitor; user interface devices such as a keyboard and/or mouse; RAM and disk drive memory; a modem; a database comprising address correction data; and interface cable 30a for providing a SCSI interface connection to addressing subsystem 20.

Addressing subsystem 20 is a client server interface system comprising: data processing system 22 connected to addressing subsystem 10 by SCSI interface connection 30a. Data processing system 22 can be a mainframe, midframe, or micro-computer which in turn is comprised of: a monitor; user interface devices such as a keyboard and/or mouse; RAM and disk drive memory; a modem; a database comprising address correction data; interface connection 30e for connection between the data processing system 22 and a client input station 26; and, interface connection 30b for connection between data processing system 22 and a server batch driver system 24. In turn, client input station 26 is connected to interface connection 30d for connecting to address database 28; and, server batch driver system 24 is connected to address database 28 via interface connection 30c.

A data processing system that can download data that can be printed on a printer, whether that printer is a peripheral device of the data processing system or not, uses application programs for creating data. These are resident in the data processing system ROM memory, additional memory, or external devices such as database 28 can be utilized for the storing of address lists. The printers commonly utilized in the addressing art may also contain a microprocessor that is able to assign bar code data to addresses that are delivered from the host. These so-called "smart" printers vary in their ability to process data.

Turning to FIG. 2, there is shown a high level flowchart of the subject method within the system of FIG. 1.

The method begins at step 50 where the system operator initiates an addressing application. The method advances from step 50 to step 52 where the system user calls up an address record from a CASS certified addressing system such as the SmartMailer system available from Pitney Bowes of Stamford, Conn.; or, the system user can simply enter the name and address data as part of a request. The address record can be resident in a database which is located within a memory of the addressing system or can be called up from a remote database. The address data request is transferred to either a client batch driver or to a system batch driver; the request can contain one or more address records to be checked. At step 54, the batch driver transmits the request via conventional communications means to an interface application resident in a client server system such as the ForwardTrak system available from Pitney Bowes of Stamford, Conn. The ForwardTrak system is the subject of this application; an operator guide is attached hereto and incorporated herein by reference.

The interface application receives the address data request at step 56 and begins reformatting the input data from the format of the initiating application to the format of the master system application to which the address data request is to be forwarded. Reformatting of the address data request is completed at step 58 when the interface application simulates an MLOCR interface that is capable of transferring the data via a SCSI connector to the master system application; the method at step 58 is also suitable for use with a mailing list correction scheme (MLC).

Once the MLOCR, or MLC, interface is formatted, the interface application invokes the master system application at step 60. In a preferred embodiment of the present application, the master system application is the U.S.P.S. FastForward system.

Once the master system application has been invoked, the address data request is transmitted from the interface application to the master system application at step 62. The master system application receives the request at step 64 and processes the request by matching the address data request to a list of changed addresses (National Change of Address Database, or NCOA), determining whether or not a match has occurred, and then determining a reply which is to be sent back to the interface application at step 66.

At step 66, the interface application receives the reply from the master system application. The reply is reformatted by the interface application to a format readable by the initiating application. The interface application transmits the reformatted reply to the initiating application at step 68. The method then advances to step 70, where the initiating application utilizes the new address to update the corresponding address record of the address database if the reply is based upon a match found by the master system application in the change of address database; otherwise, the reply simply indicates that no match has been found and the initiating application will process the address data accordingly.

From step 70, the method advances to a query at step 72 which asks whether a next request is to be entered. If the response to the query is "YES," then the method returns to step 52 where a new address data request is entered; however, if the response to the query at step 72 is "NO," then the initiating application closes out the data request application.

Figure 3A:
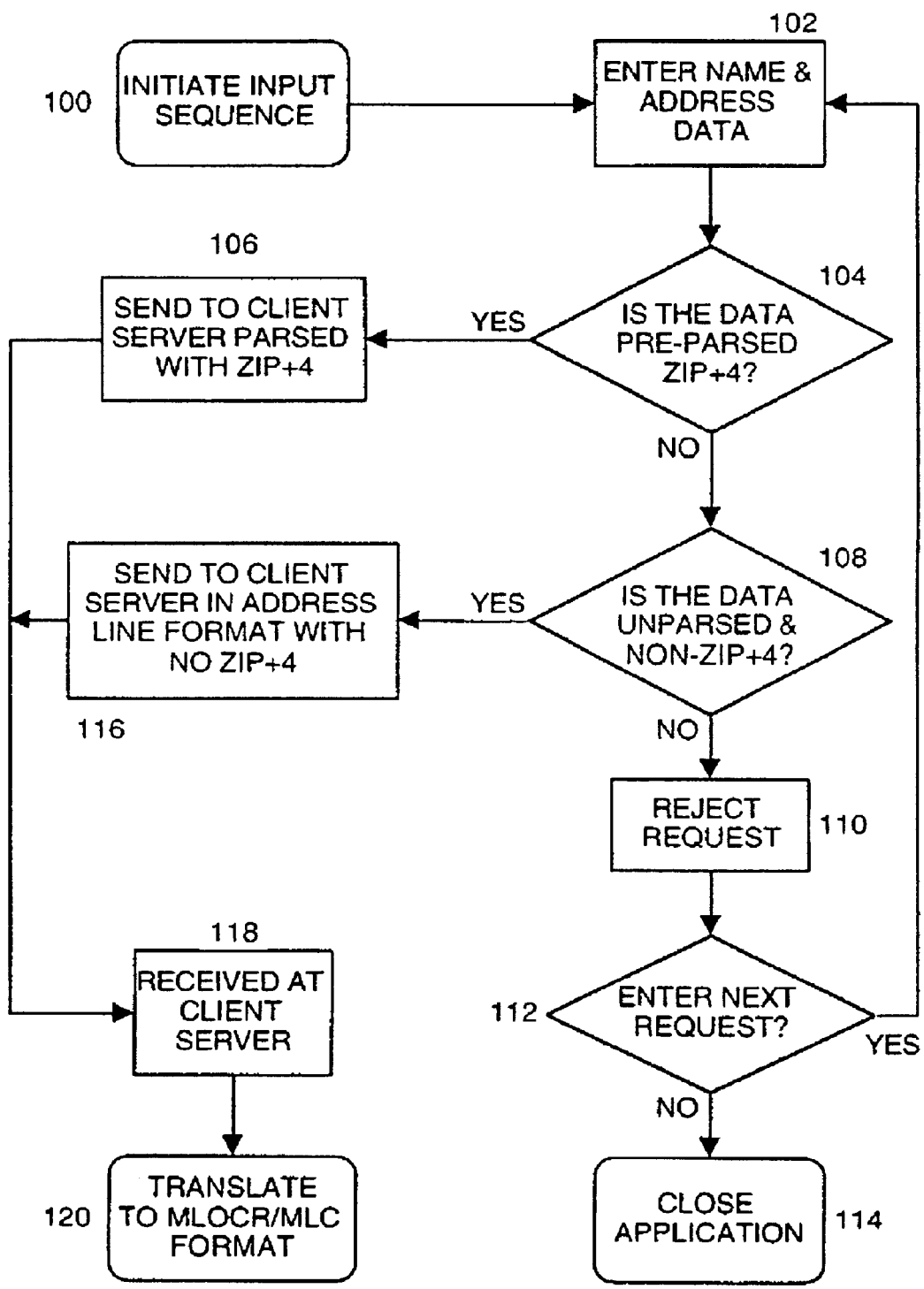
FIG. 3A is a flowchart of the method of the address record input up to the point of translation at the interface application of the client server.

Turning to FIG. 3A, there is shown a flowchart of the method of the address record input up to the point of translation at the interface application of the client server.

The method begins at step 100 where the data input sequence is initiated. Name and address data, representative of an address record request, is entered into the application, at step 102, by either entering the data directly through an operator input device such as a keypad or scanner; or, the data can be brought into the application from an address database. The purpose of the address record request is to determine whether the addressee has indicated a change of address to a master application such as the National Change of Address (NCOA) database. Once the data is entered, the system queries at step 104 as to whether or not the entered data is in a pre-parsed zip+4 format. If the response to the query is "YES," then the system advances to step 106 where the address data request is sent to the batch driver and then on to a client server system hosting an interface application such as ForwardTrak. The method advances from step 106 to step 118.

Returning to step 104, if the response to the query is "NO," then the method advances to a query at step 108 which asks whether or not the data is unparsed and in a non-zip+4 format. If the response to the query is "NO," then the system advances to step 110 where the address data request is rejected and the system turns to a query at step 112. At step 112, the method queries as to whether or not there is a next address data request. If the response to the request is "YES," then the method turns to re-enter the flow at step 102. If, however, the response to the query at step 112 is "NO," then the method advances to step 114 where the application is closed.

Returning to step 108, if the response to the query is "YES," the method turns to step 116 where the address data request is sent to the batch driver in address line format and then on to a client server system hosting an interface application such as ForwardTrak. The data is received at the client server at step 118 before being translated to an MLOCR or MLC format at step 120. The translation into an MLOCR or MLC format is detailed in FIG. 4.

Figure 3B:
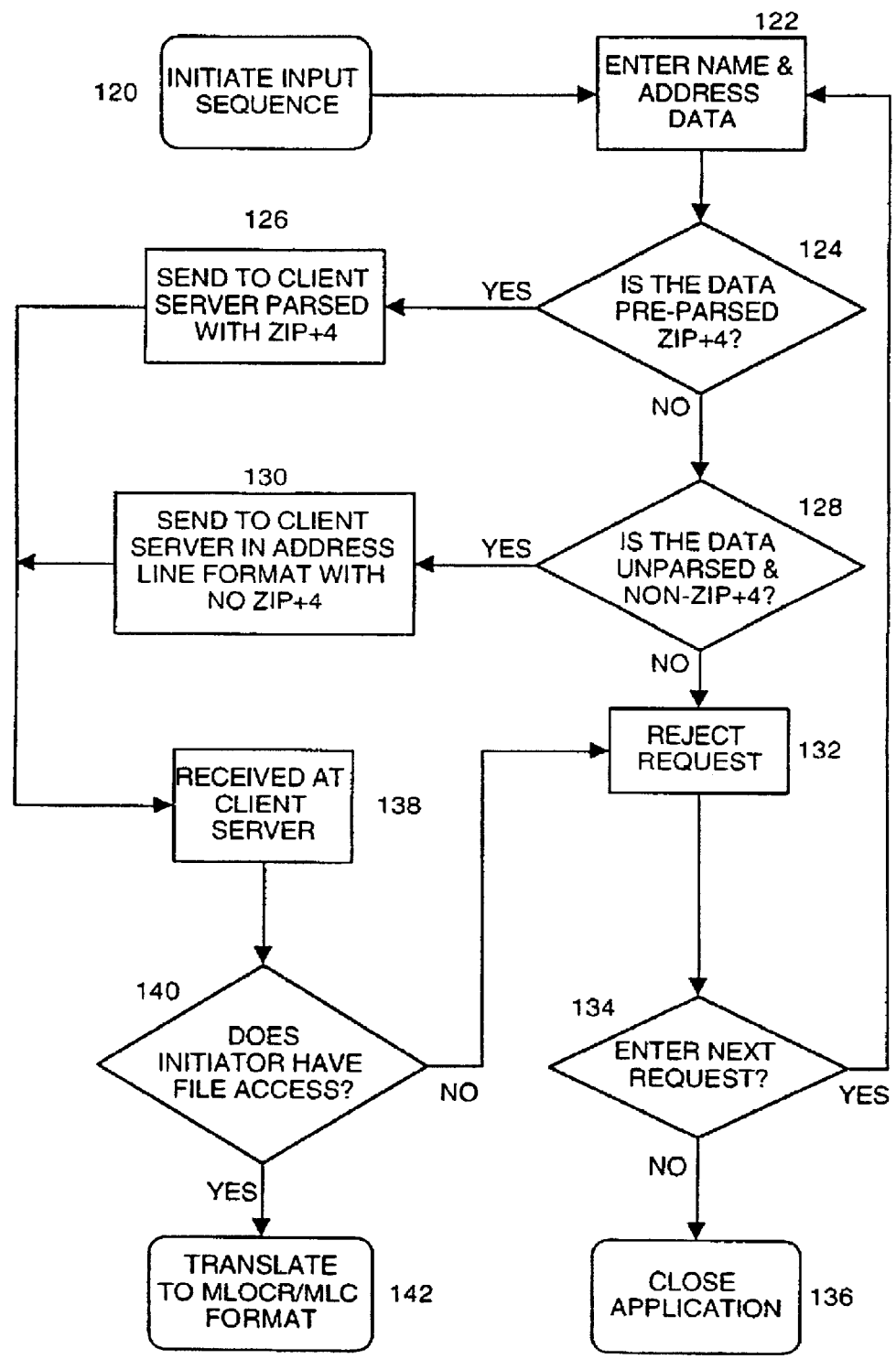
FIG. 3B is an alternate embodiment of the method of FIG. 3A wherein the system queries as to the access rights of the initiator.

Turning to FIG. 3B, there is shown a flowchart of an alternative embodiment of the method of FIG. 3A, wherein the clearance level of the request initiator is checked before the client server prepares the request for translation.

The method begins at step 120 where the data input sequence is initiated. Name and address data, representative of an address record request, is entered into the application, at step 122, by either entering the data directly through an operator input device such as a keypad or scanner; or, the data can be brought into the application from an address database. The purpose of the address record request is to determine whether the addressee has indicated a change of address to a master application such as the National Change of Address (NCOA) database. Once the data is entered, the system queries at step 124 as to whether or not the entered data is in a pre-parsed zip+4 format. If the response to the query is "YES," then the system advances to step 126 where the address data request is sent to the batch driver and then on to a client server system hosting an interface application such as ForwardTrak. The method advances from step 126 to step 138.

Returning to step 124, if the response to the query is "NO," then the method advances to a query at step 128 which asks whether or not the data is unparsed and in a non-zip+4 format. If the response to the query is "NO," then the system advances to step 132 where the address data request is rejected at step 132 before the system turns to a query at step 134. At step 134, the method queries as to whether or not there is a next address data request. If the response to the request is "YES," then the method turns to re-enter the flow at step 122. If, however, the response to the query at step 134 is "NO," then the method advances to step 136 where the application is closed.

Returning to step 128, if the response to the query is "YES," the method turns to step 130 where the address data request is sent to the batch driver in address line format and then on to a client server system hosting an interface application such as ForwardTrak. The data is received at the client server at step 138. From step 138 the system advances to a query at step 140 which asks if the request initiator has file access. If the response to the query is "NO," then the request is rejected at step 132. However, if the response to the query at step 140 is "YES," then the system advances to step 142 before being translated to an MLOCR or MLC format at step 142. The translation into an MLOCR or MLC format is detailed in FIG. 4.

Figure 4:
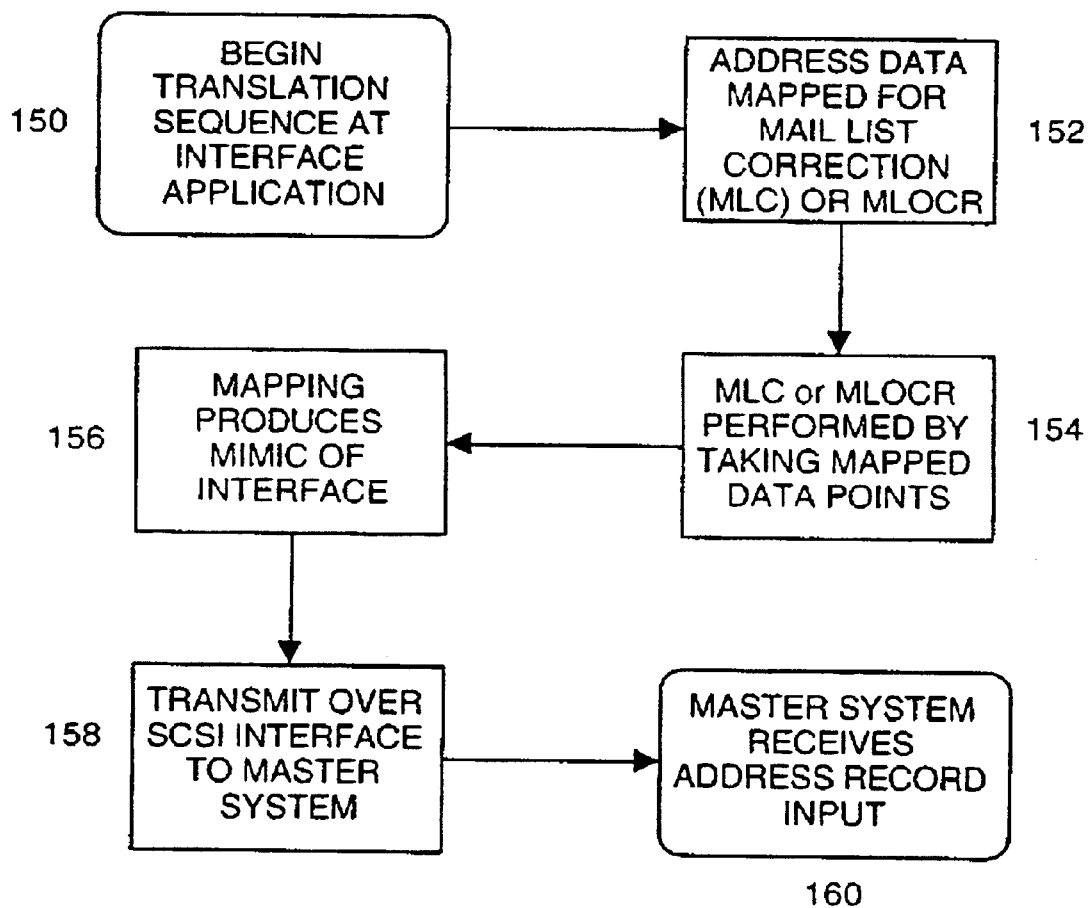
FIG. 4 is a flowchart of the steps of the translation process.

Turning to FIG. 4, there is shown a flowchart of the steps of the translation process that are performed by the interface application. The application begins the translation sequence at step 150 and advances to step 152 where the address data is mapped into either an MLC or an MLOCR format depending upon the requirements of the master system or the system interface by comparing the mapped data to a look-up data of corresponding values to produce either the MLC or MLOCR data map. From step 152, the method advances to step 154 where the format requirements are performed before advancing to step 156.

At step 156, the method takes the mapped MLOCR or MLC data and establishes an MLOCR or MLC interface that is capable of allowing transmission of the data, at step 158, over a SCSI interface to the master system application. The address record request is received by the master system application at step 160.

Figure 5:
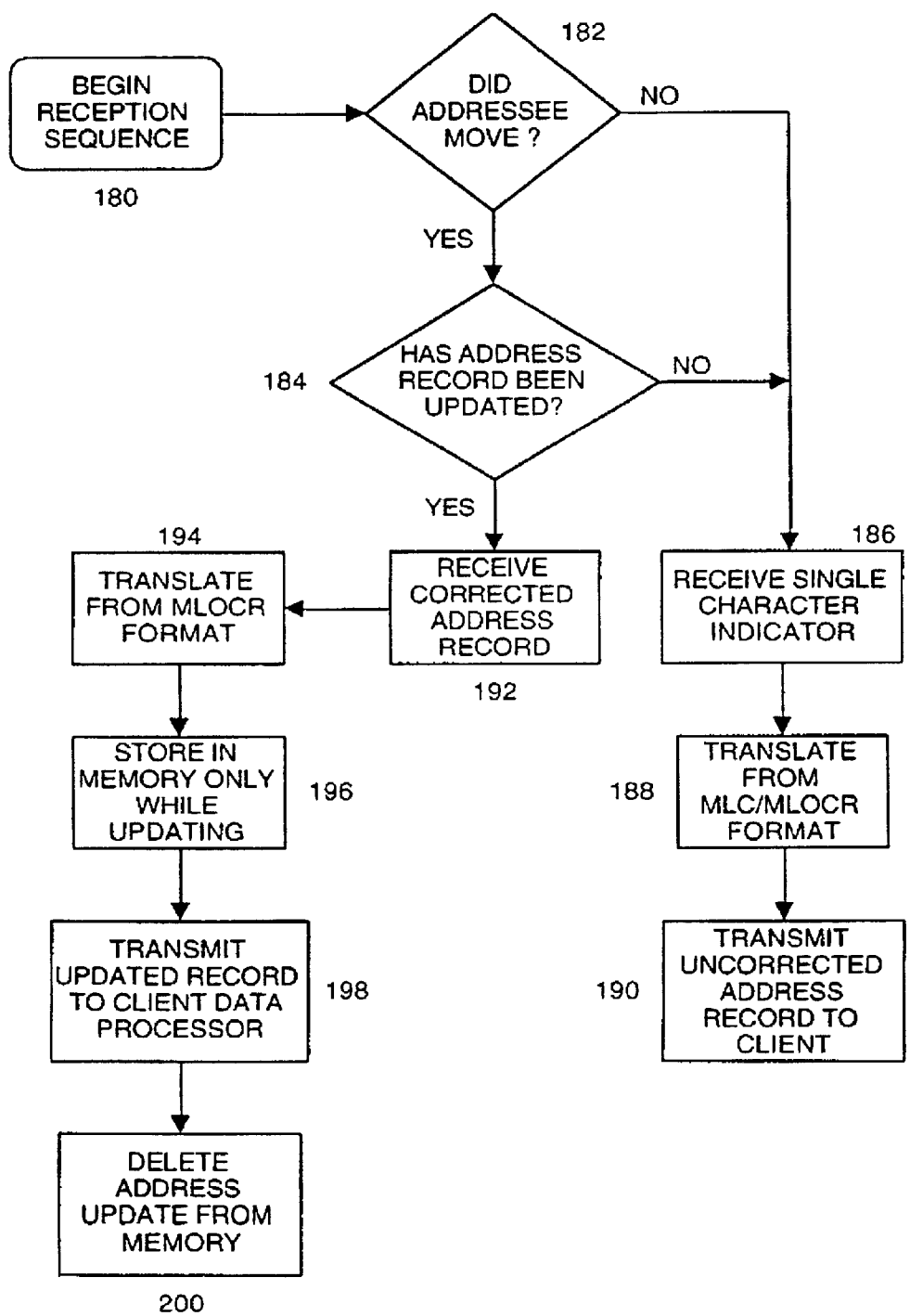
FIG. 5 is a flowchart of the method steps upon receiving the address record file from the master system.

Turning to FIG. 5, there is shown a flowchart of the method steps that are followed upon receiving the address record file from the master system application.

The master system application performs the steps of record matching to determine whether or not there is a match between an address record request and a change of address as filed on the NCOA database. If there is a match, then the master system application will post the new address to the request and return the new file as a reply; in this way, the initiating application can make an appropriate change to its database upon receiving the reply. However, if no match is determined by the master system application, then the reply will contain a notation that no change of address could be determined.

The reply is sent by the master system application to the interface application via a SCSI transmission interface. There are three possible alternative replies that can be received: (1) the addressee has moved and left a forwarding address; the addressee has moved and not left a forwarding address; or, (3) the addressee has not moved. Upon receiving the reply at step 180, the system advances to step 182 where it queries as to whether or not the addressee who/which is the subject of the address record request has moved from the address of record. If the response to the query is "NO," then the system advances to step 186 where the uncorrected (unmatched) address data reply is accepted for translation. If however, the response to the query at step 182 is "YES," then the system advances to the dependent query at step 184. which queries as to whether or not the address record has been corrected (a match found) by the master system application. If the response to the query is "NO," then the method advances to step 186 where the uncorrected (unmatched) address data reply is accepted for translation. The translation of the uncorrected reply from MLOCR or MLC format to the format of the initiating application is performed at step 188 before being transmitted to the initiating application (client) by the interface application (client server) at step 190.

Returning to step 184, if the response to the query is "YES," then method advances to step 192 where the corrected (matched) address data reply is accepted for translation. The translation of the corrected reply from MLOCR or MLC format to the format of the initiating application is performed at step 194. While the translation is being performed, the interface application holds the updated record in memory, at step 196, long enough to update the interface application (client server) before transmitting the corrected address record to the initiating application (client) at step 198. After transmission of the corrected address record, the system advances to step 200 where the corrected address record is deleted from the memory of the interface application. If the transmission of the corrected address record at step 198 were to be unsuccessful, then the initiating would have to repeat their address update request.

In an alternate embodiment of the subject invention, the interface application queries as to whether or not the transmission to the initiating application was successful. If the response to the query is "YES," then the system advances to direct the interface application to delete the corrected address data reply from memory. If, however, the response to the query is "NO," then the interface application, holds the corrected address data file in memory for later retransmission. Attempts at retransmission will occur until the record is purged from the interface application or until the system has received an indication that the corrected record has been successfully delivered.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of updating address data in a first data processing system comprising the steps of:
    (a) initiating an address data request at said first data processing system;
    (b) transmitting said address data request from said first data processing (system to an application host system;
    (c) translating said address data request at said application host system into a format readable by a second data processing system;
    (d) creating an interface between said application host system and said second data processing system wherein said interface allows passage of said translated address data request from said application host system to said second data processing system so that said translated address data request can be read and responded to by said second data processing system;
    (e) matching said address data request to records of address changes that are resident in a first address database operatively connected with said second data processing system;
    (f) determining whether a match exists between said address data request and an address record resident on said first address database and placing a result of said determination into an address data reply;
    (g) transmitting said result from said second data processing system to said application host system;
    (h) translating said result into a reply format capable of being read by said first data processing system;
    (i) transmitting said reply format to said first data processing system; and
    (j) updating a second address database operatively connected to said first data processing system by entering a new address extracted from said reply format if said result were a positive response.

2. The method of claim 1, wherein said translation step comprises the further steps of:
    (a) creating a first data map of a first set of data representative of said address data request;
    (b) comparing said first data map against a second set of data representative of a mailing list correction (MLC) or multi-line optical character reader format to establish a second data map representative of said address request; and
    (c) transmitting said second data map to said second data processing system for processing of said address request.

3. The method of claim 1, wherein said first data processing system prints a plurality of reports and wherein said plurality of reports are representative of a transaction comprising said request, and/or said reply, and/or a set of statistics derived from said transaction parameters.

4. The method of claim 1, wherein said address data request comprises a plurality of address data records and wherein each of said plurality of address data records are representative of a destination address.

5. A system of updating address records comprising:
    (a) a first data processing system further comprising:
        (i) data entry means for entering address data to a request for service;

(ii) first communication means for transmitting said request for service to a client server interface system and for receiving a reply to said service request from said client server interface system;

(iii) record update means for updating an address data record if said reply contains data indicating an address record change;

(b) a second data processing system comprising said client server interface system, wherein said second data processing system further comprises:

(i) second communication means for receiving said request from said first data processing system, for transmitting a reformatted request to an address retrieval system, for receiving said reply to said reformatted request from said address retrieval system, and for transmitting a reformatted reply to said first data processing system;

(ii) translation means for translating said request into said reformatted request capable of being understood by said address retrieval system;

(c) third data processing means comprising said address retrieval system;

(d) address correction means for reading said reformatted reply, determining if updated address data is contained within said reformatted reply, and correcting a listing of address records capable of being accessed by said first data processing means; and (e) an address database for storing said listing of address records.

6. The system of claim 5, wherein said address data is selected from among a plurality of address data records contained within a database resident in a memory.

7. The system of claim 6, wherein said memory is co-located with said first data processing system.

8. The system of claim 6, wherein said memory is located at a client server data processing system which is linked to said first data processing system by communication means for exchanging data between said first data processing system and said client server data processing system.

9. The system of claim 5, wherein said first data processing system further comprises a printer for printing one or more pre-determined reports wherein said one or more reports are representative of a transaction comprising said request, and/or said reply, and/or a set of statistics derived from said transaction parameters.

10. The system of claim 5, wherein said address retrieval system further comprises a postal service change of address database.

* * * * *